United States Patent
Alkhatib

(10) Patent No.: US 10,107,927 B2
(45) Date of Patent: Oct. 23, 2018

(54) QUICK 4D DETECTION SEISMIC SURVEY

(71) Applicant: SPOTLIGHT, Paris (FR)

(72) Inventor: Habib Alkhatib, Paris (FR)

(73) Assignee: SPOTLIGHT, Paris (FR)

(*) Notice: Subject to any disclaimer, the term of this patent is extended or adjusted under 35 U.S.C. 154(b) by 85 days.

(21) Appl. No.: 15/171,067

(22) Filed: Jun. 2, 2016

(65) Prior Publication Data

US 2016/0356905 A1 Dec. 8, 2016

Related U.S. Application Data

(60) Provisional application No. 62/170,697, filed on Jun. 4, 2015.

(51) Int. Cl.
*G01V 1/30* (2006.01)

(52) U.S. Cl.
CPC .......... *G01V 1/308* (2013.01); *G01V 2210/51* (2013.01); *G01V 2210/6122* (2013.01)

(58) Field of Classification Search
CPC .............. G01V 1/308; G01V 2210/51; G01V 2210/6122
USPC ........................................................ 367/56
See application file for complete search history.

(56) References Cited

U.S. PATENT DOCUMENTS

| | | | |
|---|---|---|---|
| 5,289,433 A | 2/1994 | Cowles et al. | |
| 5,343,001 A | 8/1994 | Cowles et al. | |
| 5,583,825 A * | 12/1996 | Carrazzone | G01V 1/288 367/31 |
| 5,587,942 A * | 12/1996 | Krebs | G01V 1/301 367/50 |
| 7,242,637 B2 | 7/2007 | Van Den Beukel et al. | |
| 7,773,455 B2 * | 8/2010 | Pickering | G01V 1/30 367/38 |
| 2007/0165486 A1 | 7/2007 | Moldoveanu et al. | |
| 2009/0097358 A1* | 4/2009 | Martin | E21B 43/16 367/75 |
| 2010/0042326 A1 | 2/2010 | Bourne et al. | |
| 2010/0142323 A1 | 6/2010 | Chu et al. | |
| 2010/0312480 A1 | 12/2010 | Hansteen et al. | |

(Continued)

FOREIGN PATENT DOCUMENTS

| | | |
|---|---|---|
| WO | 2010/077568 A1 | 7/2010 |
| WO | 2014/131854 A2 | 9/2014 |

(Continued)

OTHER PUBLICATIONS

Extended European Search Report in corresponding European Application No. 16 305 624.5 dated Oct. 18, 2016.

(Continued)

*Primary Examiner* — Daniel L Murphy

(74) *Attorney, Agent, or Firm* — Patent Porfolio Builders PLLC

(57) ABSTRACT

A method for monitoring a subsurface during a 4-dimensional (4D) survey. The method includes obtaining an area of the subsurface that needs to be monitored; identifying receiver and source locations for the area and source frequencies to be emitted into the area based on demigration or inverse ray tracing; performing a light base survey for the area; performing a light monitor survey for the area; and generating an image of the area based on a comparison of (i) the light base survey, and (ii) the light monitor survey for the area.

20 Claims, 11 Drawing Sheets

(56) References Cited

U.S. PATENT DOCUMENTS

| | | |
|---|---|---|
| 2011/0038228 A1 | 2/2011 | Ligtendag et al. |
| 2011/0046934 A1 | 2/2011 | Hatchell et al. |
| 2011/0139462 A1 | 6/2011 | Bourne |
| 2011/0232902 A1 | 9/2011 | Chu |
| 2011/0249530 A1 | 10/2011 | Liu et al. |
| 2012/0008459 A1* | 1/2012 | Coste ............... G01V 1/005 367/23 |
| 2012/0014218 A1 | 1/2012 | Houck et al. |
| 2012/0140593 A1 | 6/2012 | Stoffa et al. |
| 2012/0147699 A1 | 6/2012 | Dellinger et al. |
| 2012/0155217 A1 | 6/2012 | Dellinger et al. |
| 2012/0287753 A1 | 11/2012 | Hatchell et al. |
| 2013/0013212 A1 | 1/2013 | Hatchell et al. |
| 2014/0241118 A1 | 8/2014 | Landais et al. |
| 2014/0269185 A1 | 9/2014 | Ferber et al. |
| 2015/0032380 A1 | 1/2015 | Cotton |
| 2015/0120200 A1 | 4/2015 | Brenders et al. |
| 2015/0168575 A1 | 6/2015 | Hatchell et al. |
| 2016/0187517 A1* | 6/2016 | Brenders ............ G01V 1/3808 367/15 |

FOREIGN PATENT DOCUMENTS

| | | | |
|---|---|---|---|
| WO | 2014/161044 A1 | 10/2014 | |
| WO | 2014/207229 A2 | 12/2014 | |
| WO | 2015/011160 A1 | 1/2015 | |
| WO | 2015/061098 A1 | 4/2015 | |

OTHER PUBLICATIONS

P.J. Hatchell et al., "Instantaneous 4D Seismic (i4D) for Water Injection Monitoring", 75th EAGE Conference & Exhibition incorporating SPPE EUROPEC 2013, London, UK, Jun. 10-13, 2003.

J. Morgan, "Next Generation Seismic Experiments: Wide-angle, Multi-azimuth, 3D FW—using OBS", Anisotropic fwi, FWI: Full-Waveform Inversion, Imperial College, London, Oct. 2013, pp. 1-24.

J.G.F. Stammeijer et al., "Instantaneous 4D Seismic (i4D)—An Innovative Concept to Monitor Offshore Water Injector Wells", International Petroleum Technology Conference (IPTC), Beijing, China, Mar. 26-28, 2013, IPTC 16901, pp. 1-5.

T.Y. Woma et al., "Application of Time Lapse (4D) Seismic for Petroleum Reservoir Monitoring and Management—A review", Advances in Physics Theories and Applications, vol. 23, 2013, pp. 1-7.

"4D Time-Lapse Seismic", brochure by CGGVeritas, 2008, pp. 1-16.

"i4D Helps to Maximise the Efficiency of Reservoir Surveillance Efforts and to Ensure Reservoir Integrity, Safety and Production Optimisation", Geophysical Surveillance: Insight in Reservoir Behaviour, brochure by Shell, 2014, pp. 1-36.

"Time-lapse Seismic Swaths Prove Cost-effective Alternative to Full-field 4D", Offshore magazine, May 1, 2007, vol. 37, Issue 5.

"Time-Lapse 3D VSP Processing", Accurate Monitoring of Reservoir Changes Caused by Injection and Production, product sheet by Schlumberger, 2014.

"Experience with Time-lapse Monitoring Using Ocean Bottom Nodes in Deepwater Fields", Lecture by Paul Hatchell, EAGE Educational B.V., 2014 (https://www.youtube.com/watch?v=1jm70tZ8IiE).

* cited by examiner $t_1$-$t_0$ $t_0$ $t_1$ $t_0$ $t_1$

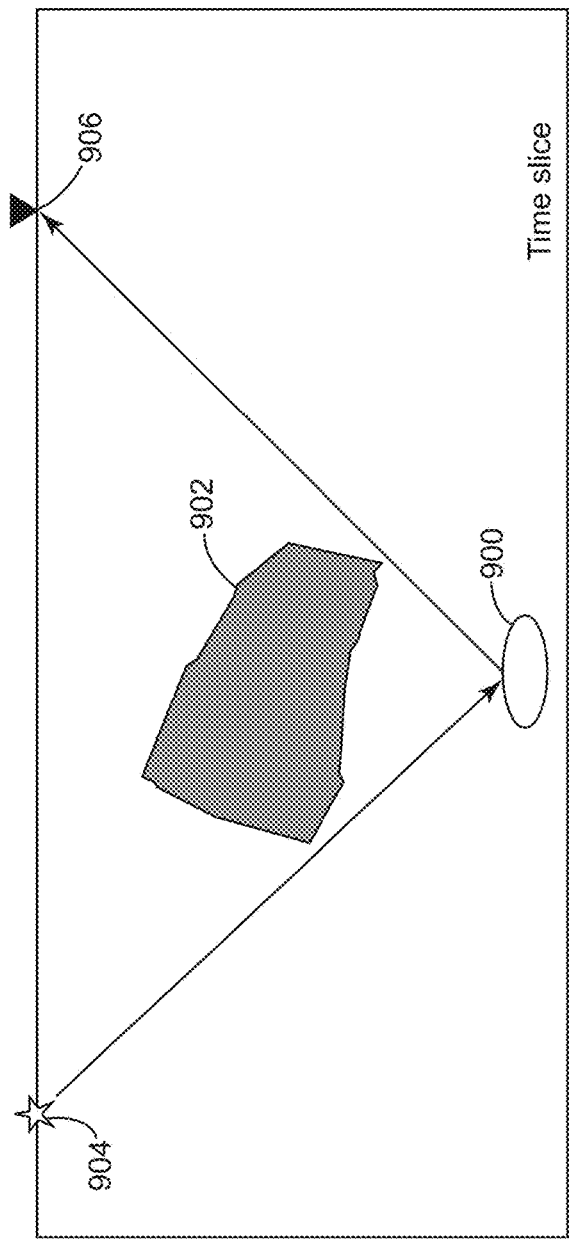
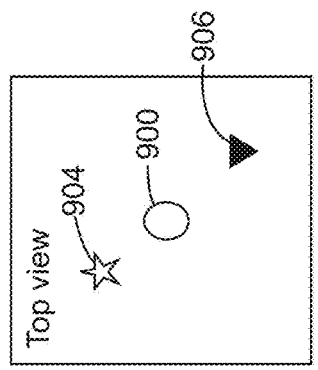
FIG. 9A
FIG. 9B

New Seismic Voxel resolution example mono-frequency

Conventional Seismic Voxel resolution

QUICK 4D DETECTION SEISMIC SURVEY

BACKGROUND

Technical Field

Embodiments of the subject matter disclosed herein generally relate to methods and systems and, more particularly, to mechanisms and techniques for monitoring a given geological structure in a subsurface in a quick and efficient manner.

Discussion of the Background

Land and marine seismic data acquisition and processing generate an image of a geophysical structure (subsurface). While this image/profile does not provide a precise location for natural resources, it suggests, to those trained in the field, the presence or absence of these resources. Thus, providing a high-resolution image of the subsurface is an ongoing process for the exploration of natural resources, including, among others, oil and/or gas.

During a marine seismic gathering process, as shown in FIG. 1, a vessel 110 tows an array of seismic receivers 111 located on streamers 112. The streamers may be disposed horizontally, i.e., lying at a constant depth relative to the ocean surface 114, or may have spatial arrangements other than horizontal, e.g., variable-depth arrangement. Vessel 110 also tows a seismic source array 116 configured to generate a seismic wave 118. Seismic wave 118 propagates downward, toward the seafloor 120, and penetrates the seafloor until, eventually, a reflecting structure 122 (reflector) reflects the seismic wave. The reflected seismic wave 124 propagates upward until it is detected by receiver 111 on streamer 112. Based on this seismic data, an image of the subsurface is generated. If a single streamer is used, the image is a 2-dimensional (2D) image. If plural streamers are towed by the vessel simultaneously, the image is 3D. A 4D image is obtained when two 3D surveys are performed for the same area with a given time interval, usually months or years.

Alternatively, ocean bottom cables (OBC) or ocean bottom nodes (OBN) and seismometers (OBS) may be used to record the seismic data. FIG. 2 shows an OBC 130 that includes plural receivers 132 distributed on the ocean bottom 120. The plural receivers 132 are connected to each other with a cable 133 that may also be connected to a data collection unit 134. Various means (e.g., underwater vehicle) may be used to retrieve the seismic data from the data collection unit 134 and bring it on the vessel 110 for processing. 3D images may be generated with such configuration.

For a land seismic survey, a system 300 for the acquisition of 4D seismic data includes plural receivers 312 (e.g., hydrophones, accelerometers, etc.) positioned over an area 312a of a subsurface to be explored and in contact with the surface 314 of the ground or in the ground. A number of seismic sources 316 (e.g., vibratory elements) are also placed on surface 314 in an area 316a in a vicinity of receivers 312. A recording device 318 is connected to the plurality of receivers 312 and placed, for example, in a station-truck 320. Each source 316 may be composed of a variable number of vibrators, typically between 1 and 5, and may include a local controller 322. A central controller 324 may be present to coordinate the shooting times of the sources 316. A GPS system 326 may be used to time-correlate the shooting of sources 316 and data acquisition by receivers 312.

With this configuration, sources 316 are controlled to generate seismic waves, and the plurality of receivers 312 records waves reflected by oil and/or gas reservoirs and other structures. The seismic survey may be repeated at various time intervals, e.g., months or years apart, to re-image the subsurface in order to determine changes in the reservoirs. Although repeatability of source and receiver locations is generally easier to achieve onshore, variations caused by changes in near-surface can be significantly larger than reservoir fluid displacement, making time-lapse 4D seismic acquisition and repeatability challenging.

One or more of the above-noted techniques may be used to monitor a producing reservoir. For these instances, the goal of 4D processing is to determine how and where earth properties change by evaluating differences in processed seismic data acquired at different times, usually before (i.e., the baseline survey) and after (i.e., the monitor survey) a period of fluid production from a petroleum reservoir. Success of 4D processing depends on the accuracy with which differences in acquisition or subsurface changes not related to fluid production are compensated for during data processing and imaging, in order that 4D noise (the difference of migrated images not related to fluid production) is kept reasonably quiet. Relevant sources of 4D noise include differences in wave field sampling caused by different survey acquisition parameters between baseline and monitor.

Currently, the 4D seismic solutions are aimed at providing an update of the full subsurface 3D structural image. In other words, both the base and monitor surveys collect a substantial amount of seismic data for generating a full subsurface 3D structural image of the volume of interest. A comparison of the full monitor survey with the previous full base survey is intended to provide the 4D changes induced by oil production.

However, a full 3D seismic survey acquires a large amount of seismic data, takes time (weeks if not months), lacks accurate repeatability and incurs a high cost. All these factors work against the 4D seismic survey, making this tool slow and expensive in spite of its usefulness.

Thus, there is a need to acquire a 4D seismic survey faster, cheaper and with more accuracy.

SUMMARY

According to an exemplary embodiment, there is a method for monitoring a subsurface during a 4-dimensional (4D) survey. The method includes obtaining an area of the subsurface that needs to be monitored; identifying receiver and source locations for the area and source frequencies to be emitted into the area based on demigration or inverse ray tracing; performing a light base survey for the area; performing a light monitor survey for the area; and generating an image of the area based on a comparison of (i) the light base survey, and (ii) the light monitor survey for the area.

According to another embodiment, there is a computing device for monitoring a subsurface during a 4-dimensional (4D) survey. The computing device includes an interface for receiving an area of the that needs to be monitored; obtaining seismic data associated with a light base survey for the area; and obtaining seismic data associated with a light monitor survey for the area. The computing device also includes a processor connected to the interface and configured to identify receiver and source locations for the area and source frequencies to be emitted into the area based on demigration or inverse ray tracing, and generate an image of the area based on a comparison of (i) the seismic data from the light base survey for the area and (ii) the seismic data from the light monitor survey for the area.

According to still another embodiment, there is a non-transitory computer readable medium including computer executable instructions, wherein the instructions, when executed by a processor, implement instructions for monitoring a subsurface during a 4-dimensional (4D) survey as discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 9A-9B illustrate a source location and a sensor location for a given target in a light monitor survey;

DETAILED DESCRIPTION

Figure 1:
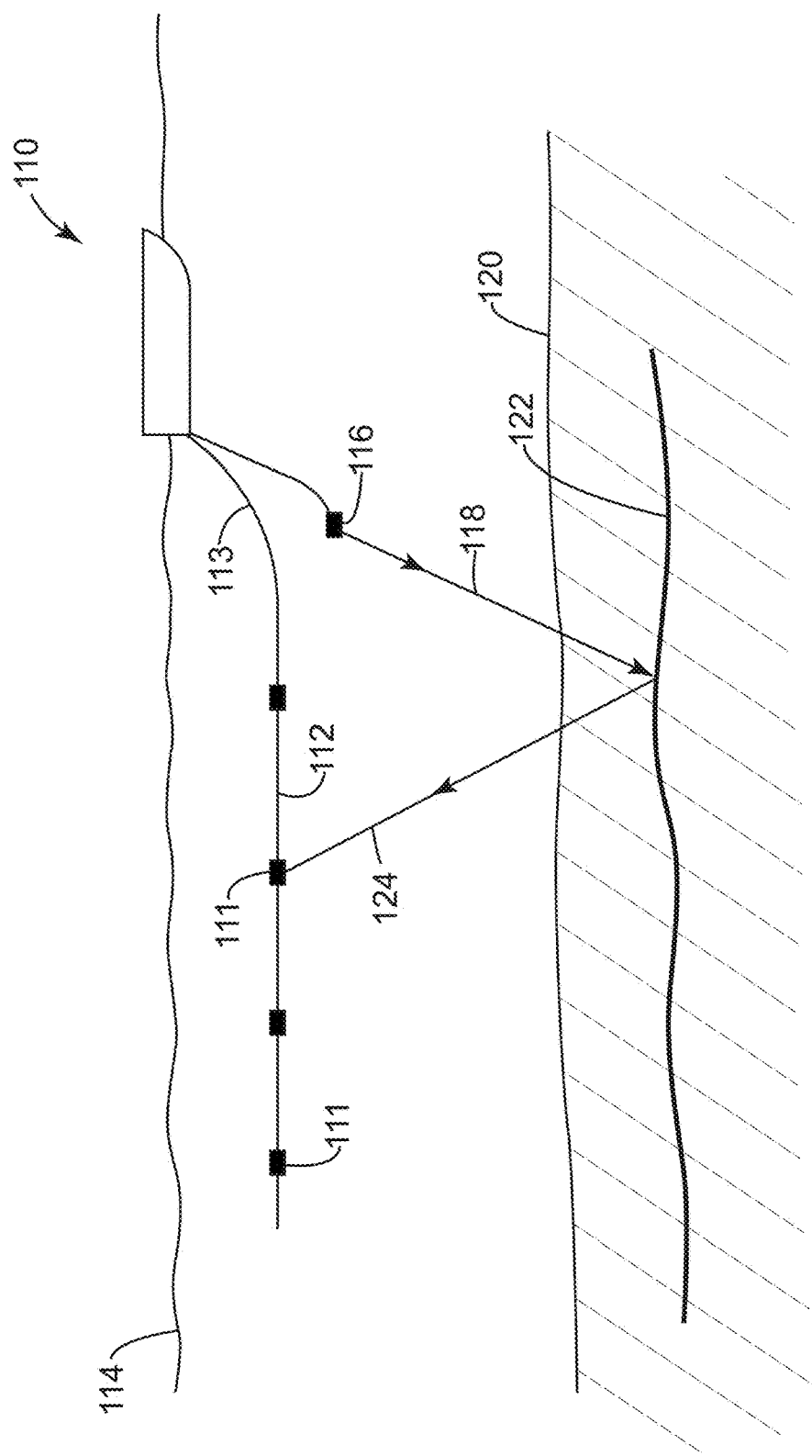
FIG. 1 is a schematic diagram of a conventional marine seismic data acquisition system.
Figure 2:
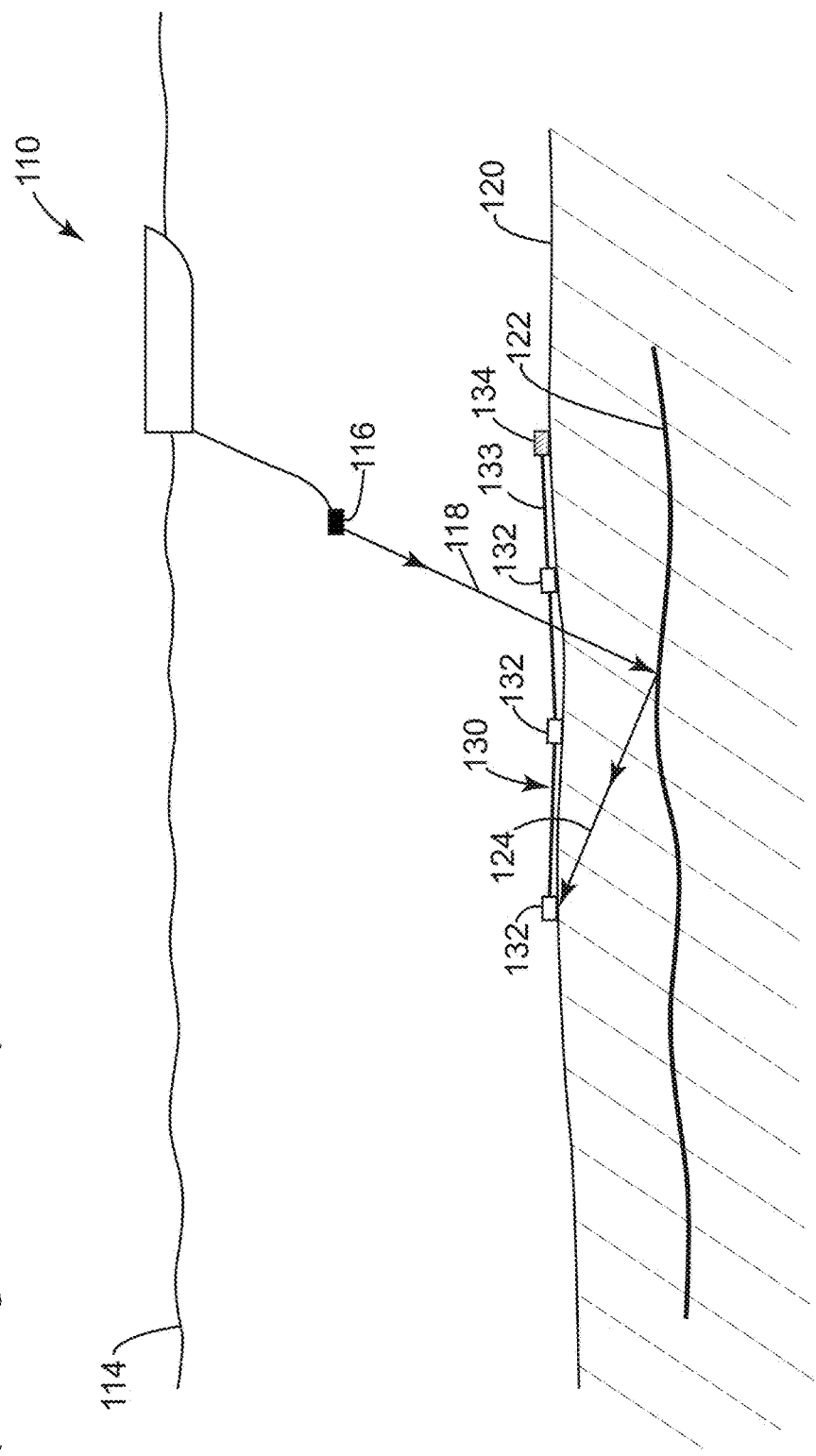
FIG. 2 is a schematic diagram of a conventional ocean bottom seismic data acquisition system.
Figure 3:
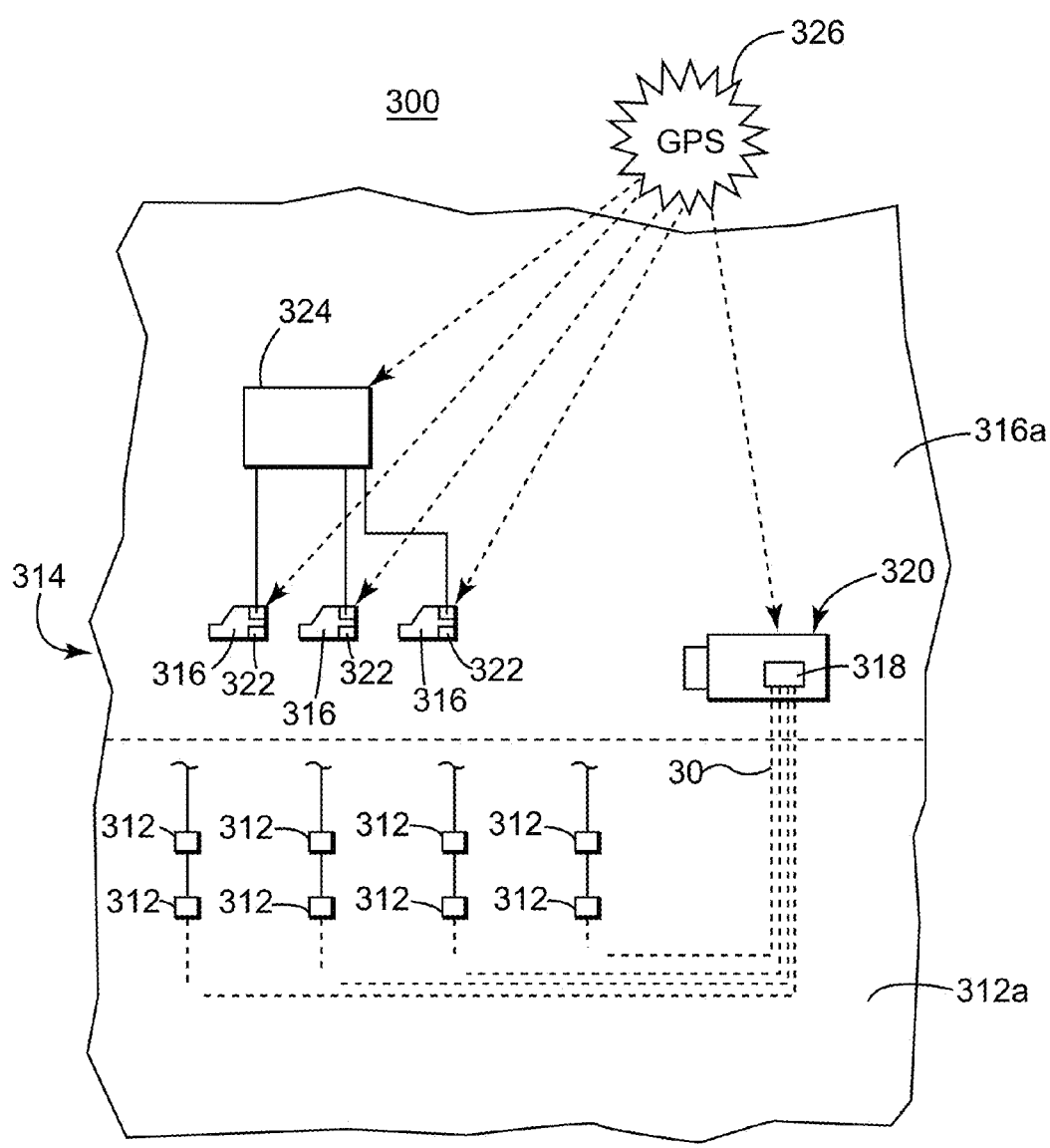
FIG. 3 is a schematic diagram of a conventional land seismic data acquisition system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a land survey. However, the embodiments to be discussed next are equally applicable to land surveys, marine surveys, ocean bottom surveys or any other type of survey that monitors time changes of one or more parameters.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As discussed above, obtaining an image of a reservoir is important to produce that reservoir. A traditional 4D seismic survey produces, at various time intervals (months to years), successive full structural images of the reservoir and its surrounding by repeating a same 3D seismic survey. For the typical 4D seismic survey, both the base and monitor surveys try to make use of the same number of sources and sensors located at the same positions. This means a long turnaround time for generation of the 4D images because the amount of seismic data to be processed is large. For example, a typical marine seismic survey may use about 10,000 sensors distributed along the streamers and each sensor can record data every 4 ms for days or months. The same is happening for land seismic surveys or ocean bottom seismic surveys. The amount of seismic data collected from such surveys is in the range of terabytes of information, and processing it takes months on a dedicated supercomputer (simply called herein a computing device). The acquisition phase takes weeks to months.

As practical examples, a 4D near offset carpet shooting with sensors on top of a salt dome in a pre-salt reservoir will not bring value. Downgrading a Broadband image (image for which the seismic data has been collected with variable depth streamers) to match with a 3D conventional acquisition is also sub-optimum. In offshore permanent reservoir monitoring (PRM, which is state of the art 4D seismic), seismic measurements over a 6 months period is typical whereas actual production changes occur on a much shorter timeframe, often days, a few weeks, or a month.

Thus, there is a need for the reservoir engineer or/and other people in charge of monitoring the production of the reservoir, which is an established technological field, to deliver a quicker result, comparatively simpler to acquire and process in a timeframe which aligns with real world production goals.

Currently there are two problems to be solved to provide the needed information: 1) how to reduce the shooting time to a timescale that aligns with the production time scale for decision making needs and requirements, and 2) how to emit and record a reliable 4D seismic signal sufficient to illuminate the target of interest.

The inventor has realized that instead of providing an image centric solution, which is the case today (i.e., all the efforts are spent for generating the best possible image for both the base and monitor surveys), providing an information centric solution (i.e., obtain a lower resolution image for strategically chosen regions of the subsurface) would better serve the needs of the reservoir engineer. This concept is explored now in more detail.

Ultimately, 4D surveys are intended to reduce production uncertainties in the field. Each field/reservoir has its own areas of uncertainty regarding the dynamic of the flow during production. To deal with these uncertainties, people in charge of production build several production scenarios and/or mechanisms to try to assess the associated production risks. Wellbore measurements may be combined with 4D seismic information to provide more accurate production forecasts by validating one or more scenarios and/or production mechanisms. In extreme cases, none of the forecasted scenarios and/or production mechanisms matches the measurements and new scenarios and/or production mechanisms need to be built. A very effective and useful tool for generating and/or validating the production scenarios and/or production mechanisms is the 4D seismic survey. However, as discussed above, a conventional 4D seismic provides long-time frame (for example, six months to one year on PRM, more with conventional 4D) updates while reservoir production decisions need to be made on a shorter time scale, e.g., monthly or weekly and even sometime daily.

The inventor has observed that for a given producing field/reservoir, the reservoir engineer's flow model and mechanism (which is used for managing the well production) are not uncertain everywhere. There are some "uncertain" areas over the full extent of the reservoir's volume and the level of uncertainty of these areas may vary from one area to another. Production scenarios and/or production mechanisms take these levels of uncertainty into account. However, to validate or discard some of these scenarios and/or production mechanisms, it is not needed to provide multiple full structural images of the subsurface, but just reliable 4D information focused on the specific areas of uncertainty. In other words, the inventor has observed that good information about the various scenarios may be obtained using the full 3D seismic survey (e.g., the base survey) to acquire light and focused data in order to detect changes in these specific strategic areas of uncertainty. In one application, the lower resolution monitor survey "samples" selected targets and not the entire field/reservoir as is the case for the full base survey. A lower resolution monitor survey results in the ability to easily and quickly determine the reservoir level or a feature effect related to various production scenarios, which allows the engineer to quickly screen those approaches.

Figure 4A:
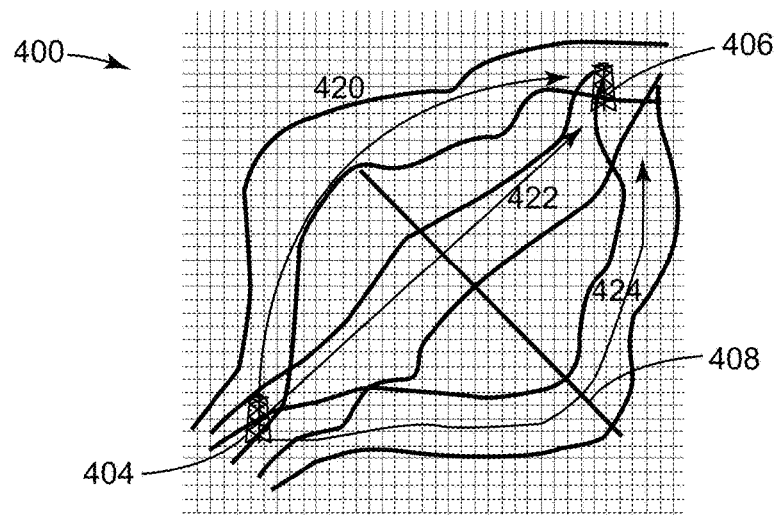
FIGS. 4A-4B illustrate a light monitor seismic survey.
Figure 4B:
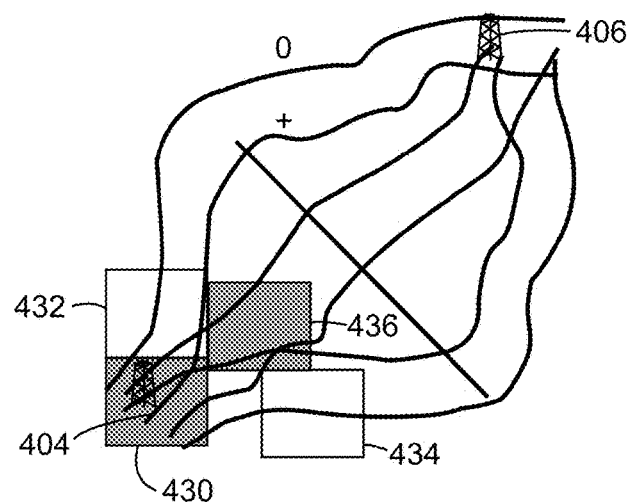

To illustrate this concept, consider the following example illustrated in FIGS. 4A-4B. FIG. 4A shows an area 400 that contains a depositional reservoir. The reservoir is expected to be there, but in a real image of the area 400, it cannot be seen. Two wells 404 and 406 are present above the depositional reservoir. The oil in the depositional reservoir flows from injector well 404 toward producer well 406. A fault 408 is present in the reservoir. Based on a full base seismic survey (full 3D seismic survey), the reservoir engineer can define three possible production paths 420, 422 and 424 and an infinite number of scenarios to take into account each possible channel production contribution.

The reservoir engineer is mainly looking for answers to the following questions: 1) Is the flow going through all channels? 2) Is the fault permeable? 3) If the fault is not permeable, where is the flow going. For the example illustrated in FIG. 4A, only reliable measurements far from the wells are able to provide enough information to build an accurate production scenario and take the right production decisions. While a seismic 4D image can produce this kind of image, it will take a long time. However, seismic 4D information can be obtained much quicker and at a fraction of the cost of obtaining the full 4D image if only some reduced measurements are performed, as illustrated in FIG. 4B. FIG. 4B shows four tiles (locations) 430, 432, 434 and 436 that are sampled with seismic waves for acquiring seismic data. The resolution of these tiles is much lower than the resolution of a traditional 3D seismic survey as only measurements enough for reducing the uncertainties are required and not a full resolution image. FIG. 4B is showing 4D information resolution needed to answer uncertainties related to question no. 1 above. For the other questions, more measurements are necessary and are directly linked to the answer to question no. 1. According to this embodiment, the measurements shown in FIG. 4B correspond to the monitor survey. The number of measurements is very much reduced relative to a full 4D seismic survey that is currently performed.

Figure 5A:
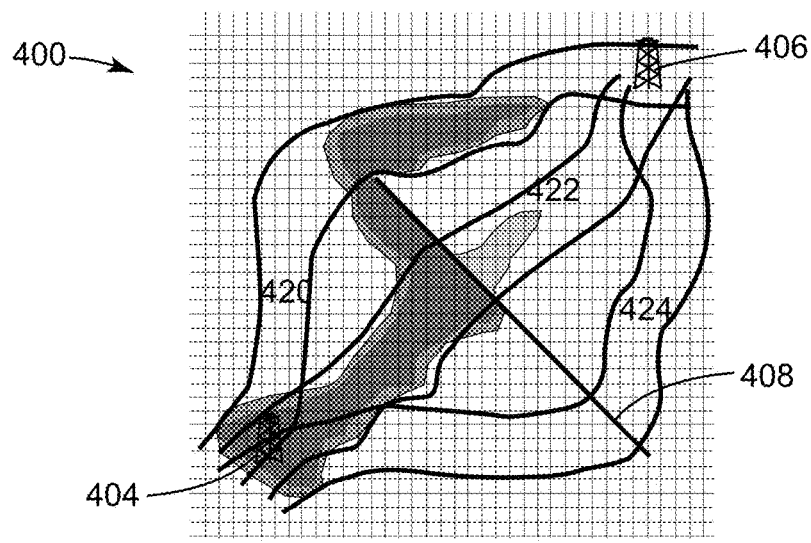
FIGS. 5A-5B further illustrate a light monitor seismic survey.
Figure 5B:
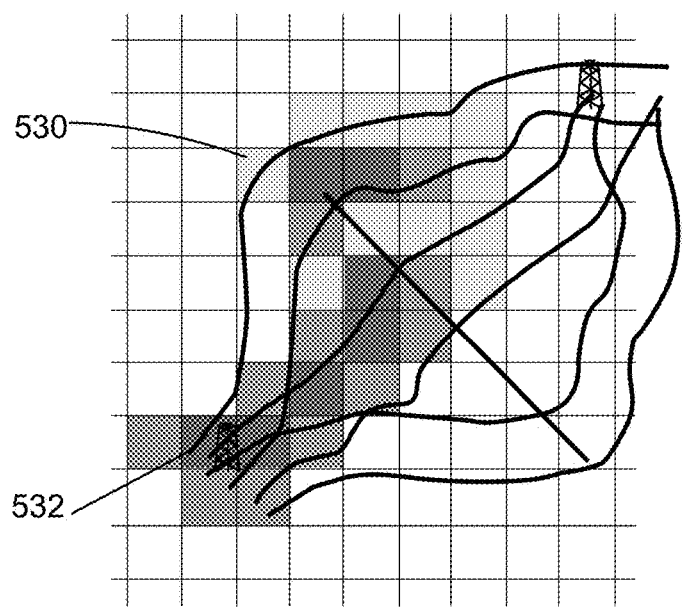

In one embodiment, an initial full base 3D seismic survey is performed to fully image reservoir 402, as illustrated in FIG. 5A. Also shown in this figure are the channels discussed above. To monitor the oil flow in the reservoir, instead of performing another full 3D survey, as traditionally performed, according to this embodiment a more limited monitor survey (called herein "light monitor survey") is performed, as illustrated in FIG. 5B. Note that plural tiles 530 are selected to cover only the area/volume where the oil flow is expected, and these tiles are illuminated with a reduced number of sources and the seismic data is recorded with a reduced number of sensors. Depending on the expected minimum resolution necessary for evaluating a corresponding feature, each tile may be illuminated with a different amount of energy for obtaining different resolutions. For example, FIG. 5B shows that tile 530 has a low resolution while tile 532 has a higher resolution. The darker the tile, the higher the resolution. Even with the higher resolution of tile 532, no tile is imaged with a resolution as high as a traditional full 3D seismic survey. In cases where only months to weeks of production changes are interesting, the initial full 3D seismic data (when acquired years prior to the changes) cannot be used as a base survey. In this case, a new light monitor survey and a new light base survey need to be made. The original 3D full survey will still be used to find the optimum location of sources/receivers location and frequencies. Also note that instead of having a system of sensors and sources that are movable, a permanent or semi-permanent system that continuously detect changes may be used. In this case, the seismic data from the base and monitor surveys should be substituted with the continuous seismic data acquired with the permanent or semi-permanent system.

For example, a continuous monitoring of the above system could be made when uncertainties are critical. In other words, if a traditional full 3D seismic survey achieves a given resolution, the resolutions used for the monitors in these embodiments are at least one order of magnitude lower. In some embodiments, the resolution is at least two orders of magnitude lower than a traditional full 3D seismic survey. The resolution of each tile is selected based on the feature(s) to be monitored.

From these examples, it is noted that a light monitor survey does not monitor the entire volume as the base survey, i.e., the light monitor survey is smaller in areal size than the base survey, and/or the resolution of the light monitor survey is lower than the resolution of the full base survey. The degree of volume reduction and/or resolution reduction of the light monitor survey relative to the base survey is now discussed.

In one embodiment, if the base survey uses thousands of receivers for recording the seismic data, the light monitor survey uses hundreds of receivers. More precisely, in one embodiment, the light monitor survey uses not more than 100 locations for locating the sources and the sensors. For example, the light monitor survey may use one source location and 99 sensor locations. In another example, the light monitor survey may use one source location and 49 sensor locations, to a total of 50 source and sensor locations. In still another example, the light monitor survey uses one source location and 19 sensor locations, to a total of 20 source and sensor locations. The ratio of source locations to sensor locations may vary for a given number of total locations. In still another example, the monitor survey uses 10 total locations for the sources and the sensors. In yet another embodiment, the monitor survey uses a single source location and a single sensor location. This last embodiment achieves fast and cheap measurements, providing enough information to characterize one feature of interest.

Figure 8:
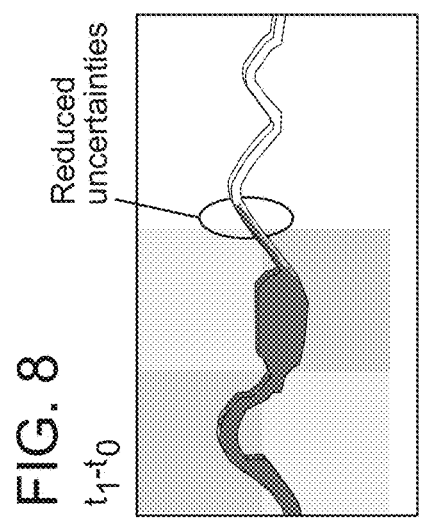
FIG. 8 illustrates a 4D image with a full base and light monitor seismic surveys.
Figure 6B:
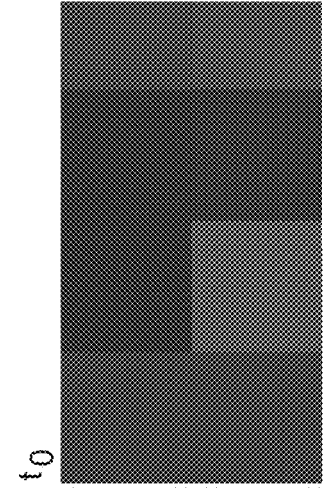
FIGS. 6A-6B and 7A-7B illustrate 4D seismic surveys using full structural images of the subsurface and reduced resolution images for the same subsurface.
Figure 6A:
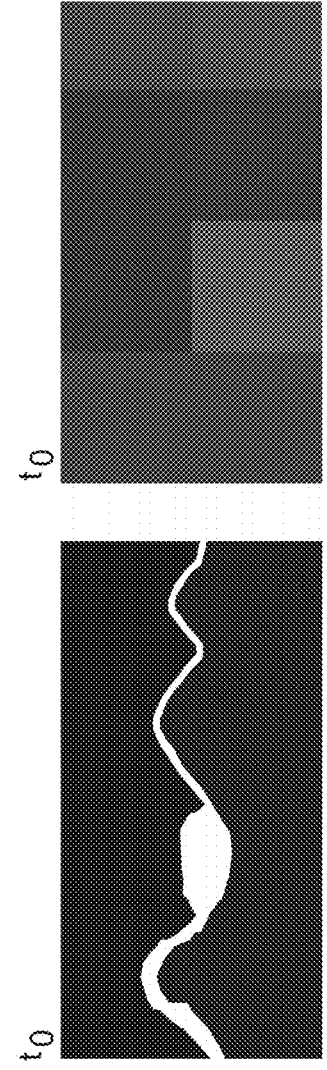

For example, FIG. 6A shows a full 3D structural image of the reservoir model that is achieved with the base survey at time t0. A later in time full monitor survey is shown in FIG. 7A, and it illustrates the changes 700 happening inside the reservoir over a period of 6 months. However, this traditional 4D imaging is expensive and slow as discussed above. FIG. 6B shows an imperfect image of the reservoir model (i.e., a low resolution image achieved with the light monitor survey) at time t0 and FIG. 7B also shows an imperfect image of the same reservoir taken at a later time t1. The images shown in FIGS. 6B and 7B may be 150 times less precise than the images shown in FIGS. 6A and 7A. However, taking into account FIG. 6A, the difference between the two images (e.g., shown in FIGS. 6B and 7B) produces enough information regarding the change occurring in the reservoir to answer the question "is this reservoir area active" in affirmative, as illustrated in FIG. 8. Because of the low resolution images shown in FIGS. 6B and 7B, which means less data acquisition and shorter processing time, the time difference t1−t0 may be small, e.g., days or weeks instead of months.

Note that a full seismic survey is understood herein as a seismic survey that includes thousands of seismic data recordings while a light seismic survey is understood to include not more than a hundred seismic data recordings, and sometimes, in the extreme, just one seismic data recording. In addition, a light seismic survey uses a narrow azimuth approach and the source or sources involved in such a survey emit a limited frequency band, preferably a hammering of mono-frequencies. This means that plural mono-frequencies are applied to the source in a successive order, without covering the full seismic band as a sweep signal does. In this way, a light survey generates a small fraction (e.g., less than 20%) of the seismic data generated by a full seismic survey. This means that the light seismic survey can be performed fast (e.g., hours or days), and the data generated by such seismic survey can be processed fast (e.g., hours or days). Thus, the light monitor survey results can be obtained in hours or days, which is very helpful for the reservoir engineer.

Figure 7B:
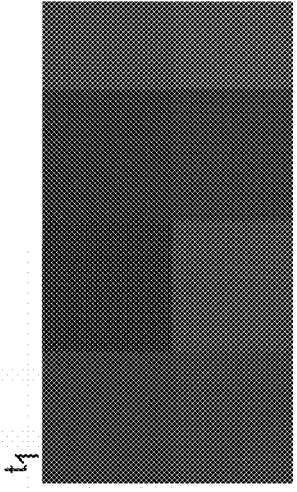
Figure 7A:
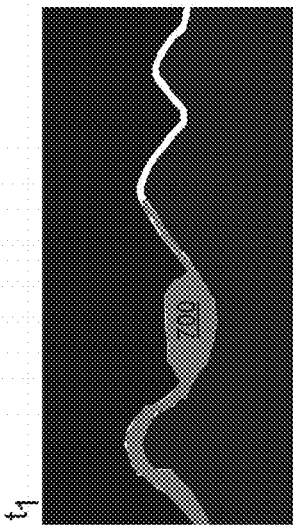

FIGS. 6B and 7B illustrate the concept of "seismic information," which require less acquisition and processing than the concept of "seismic image," which is illustrated in FIGS. 6A and 7A. Using the reservoir engineer's flow model or production mechanism made with exploration information, reservoir engineers are able to "interpret" sub-structural reliable information and reduce uncertainties using the information obtained from the light seismic survey. Even if the production uncertainty is related to the idea of a layer being active or not, a conventional 4D seismic would have imaged this reservoir with the full structural resolution (i.e., full survey), providing too much information with a longer turnaround for a prohibitive cost.

To obtain 4D information centric seismic, there is no need for wide azimuth or offsets, assuming that there is enough repeatability to obtain reliable and valuable information. In one embodiment, a single offset, single azimuth and one or several mono-frequencies acquisition will provide the needed information.

Thus, according to an embodiment, a single azimuth-offset-mono frequencies 4D seismic acquisition (extra-light survey) decreases the number of shooting/receiving locations and associated cost and turnaround. This extra-light survey is production driven to provide reliable information at the right resolution and at the right location reducing production uncertainties. The above concepts are applicable onshore and offshore.

A typical light monitor survey is illustrated in FIG. 9A, which shows a target 900 identified by the reservoir engineer as requiring additional monitoring. A known volume 902 is present above the target. The volume may be volcanic, evaporate or shallow gas pockets, which were already imaged by the full base survey. Thus, based on the information obtained from the full base survey and the required target (location and expected changes, if available), the optimum source location 904 and the optimum sensor location 906 may be calculated. One or more sources and/or sensors may be placed at these locations to generate and collect the necessary seismic data. FIG. 9B shows a bird-eye view of the elements shown in FIG. 9A.

While FIGS. 9A and 9B show a single source location and a single sensor location, the light monitor survey may include up to 100 source and sensor locations, where the split between source and sensor locations can be anything. The number of source and sensor locations is dictated by the number of targets to be imaged, and the amount of information necessary to discriminate reservoir engineer's scenarios after a full 3D imaging. In one embodiment, it is possible to have a full base survey followed by a couple of light monitor surveys followed by a full monitor survey followed by other light monitor surveys. One or more of the light monitor survey may be replaced with extra-light surveys. The engineer's scenarios/mechanisms can be validated based on the information provided by a light monitor survey instead of a full monitor survey. Although the method discussed herein is very sparse, it provides reliable information.

A 4D information centric seismic survey design should consider receiving enough 4D signal-to-ratio (S/N) to obtain reliable information with much less measurement points. For this, the following considerations should be taken into account:

Maximize the S/N at target→Define the right receiver/source locations and optimum frequencies
Minimize the 4D noise→Stationary source & receiver
Adaptability→Production uncertainties are evolving with time and measurements gathered, the solution should be able to quickly adapt to these changes to always provide valuable information These considerations are now discussed in more detail. To maximize the S/N at the target, the receiver and source locations need to be determined. Knowing the structure of the subsurface and the wave field propagation from the full 3D seismic survey, it is possible to calculate, knowing the location of target 900 (see FIGS. 9A and 9B) and when available, the expected changes, the optimal source locations and the sensor locations. To do so, demigration and/or inverse ray tracing from the target can be performed using the full 3D survey data. Note that FIGS. 9A and 9B shows a single source location and a single sensor location and one optimal ray trace. However, multiple locations may be calculated for the light monitor survey. These calculations also take into account the reservoir dynamic model (AVO class expected effect) and the needed resolution for the target position.

Figure 10B:
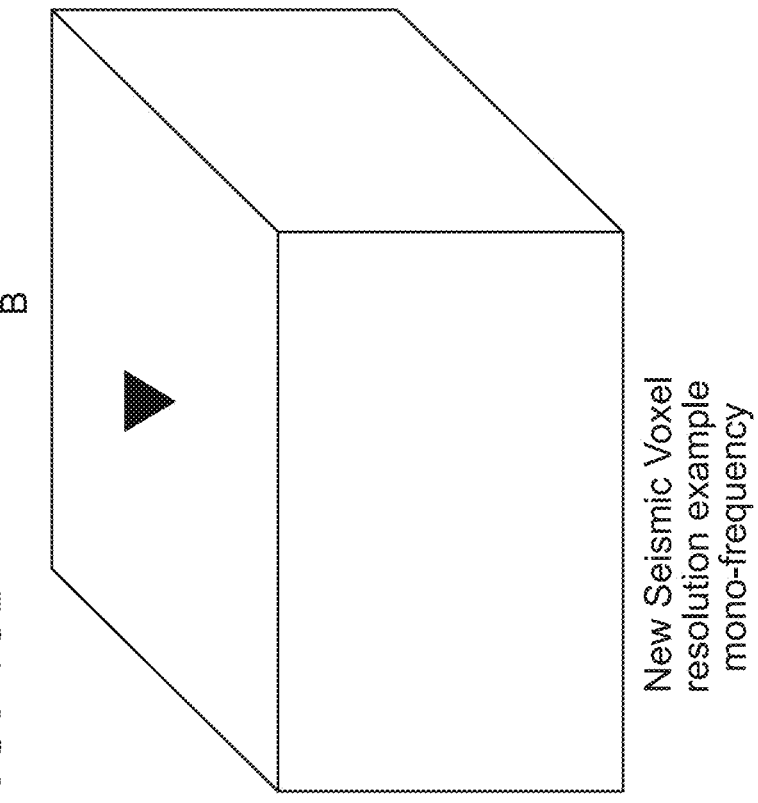
FIGS. 10A-10B illustrate a voxel resolution for a base survey and a monitor survey.
Figure 10A:
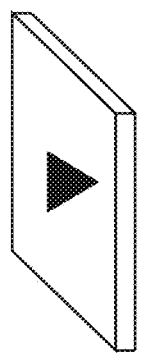

In addition to determining the source and sensor locations, the calculations determine what frequency or frequencies the source should emit. In one embodiment, a single frequency is determined for a given source. In another embodiment, several mono frequencies are determined. In conventional 3D or 4D seismic surveys, a broadband source signal is used to get as many frequencies as possible for the structural imaging. This range aims to include at least the zero to 200 Hz range. Under these conditions, the X-Y source/receiver grid is often restricting the X-Y resolution (i.e., the receiver grid density provides the X-Y resolution), while the Z resolution is defined by the Q absorption of the high frequencies in the earth. Conventional 3D and 4D seismic voxels (or cubes) are often anisotropic voxels as shown in FIG. 10A.

For a given reservoir layer, seismic exploration provides information about seismic velocity at target. These velocities are used to compute optimum mono-frequencies (or just one) to get the needed X-Y and Z resolutions to reduce uncertainties, as illustrated in FIG. 10B. Note that the cube (in reality more like an ellipsoid) in FIG. 10B is much larger than in FIG. 10A because the necessary resolution is much lower. For each case, one source/receiver location is needed. The X-Y and Z optimum resolutions could be different if it brings value to the reservoir understanding.

The following example is provided for this embodiment. The seismic resolution of a given volume varies with the frequency depending on the seismic velocity in the volume. Assuming a seismic velocity of 5500 m/s in a pre-salt carbonate, it can be shown that the resolution in meters versus frequency is given by Table 1 (for a zero offset):

| Resolution (m) | Frequency (Hz) |
|---|---|
| 50 | 27 |
| 100 | 14 |
| 150 | 9 |
| 200 | 7 |
| 275 | 5 |

According to this table, if the production uncertainties associated with area 400 are relevant for a voxel having a 150×150×150 m size at reservoir level, there is no reason to send a source signal above or below 9 Hz. Thus, sending a 9 Hz mono-frequency source signal will be optimum. In one application, the source sends a frequency range (sweep) centered on the 9 Hz. The frequency range can be 2, 4, 8 or 10 Hz.

A hammering of several mono-frequency source signals for 4D seismic information (for extra-light monitor survey) also provides the following advantages: maximizes the source energy for the optimum frequency, increases the 4D S/N ratio, it is easier to repeat a mono-frequency source signal, and it eases a phase shift based 4D seismic processing approach. Hammering several mono-frequency signals can also ease the localization precision of the strategic area. For example, it is possible to use the ghost and change the source depth to bring some directivity to the sources.

Minimizing the 4D noise is the next consideration to be discussed with regard to the (extra) light monitor survey. To reduce uncertainties, reservoir engineers need reliable information. Reducing the 4D noise is necessary in this regard. All repeatable noises during the production's time-lapse window, such as active pipes or internal multiples, are not considered to be 4D noises (and they can even be used as a seismic signal). Every non-repeatable 4D noise should be reduced and this noise includes:
Receivers and sources should be able to be positioned or repositioned to the exact same location for each survey, which is much easier with a(n) (extra) light monitor survey in which a very low number of sources and receivers are used;
A stationary source/receiver solution will enable continuous shooting and recording. Given the low number of sources and sensors used by the light monitor survey, e.g., one source and one sensor, it is much easier to maintain the source and sensor permanently at their locations so that their positions do not change from survey to survey;
The source signal energy should be tuned to maximize the S/N ratio at reservoir level;
Static correction needs to be carefully made; and
Onshore, positioning sources and sensors below the weathering zone may be mandatory.

Adaptability is the next consideration to be discussed with regard to the light monitor survey. Production uncertainties are evolving with time and thus, their measurements should also evolve. A light monitor survey should be able to quickly adapt to new arising uncertainties. Having one or several sources capable of adapting their signal frequency, energy and position to match the new needs achieve the necessary adaptability. The sensor location may need to be adapted to the new location; thus, an agile sensor will enable such flexibility while avoiding extra costs coming from carpet receiver coverage.

Figure 11:
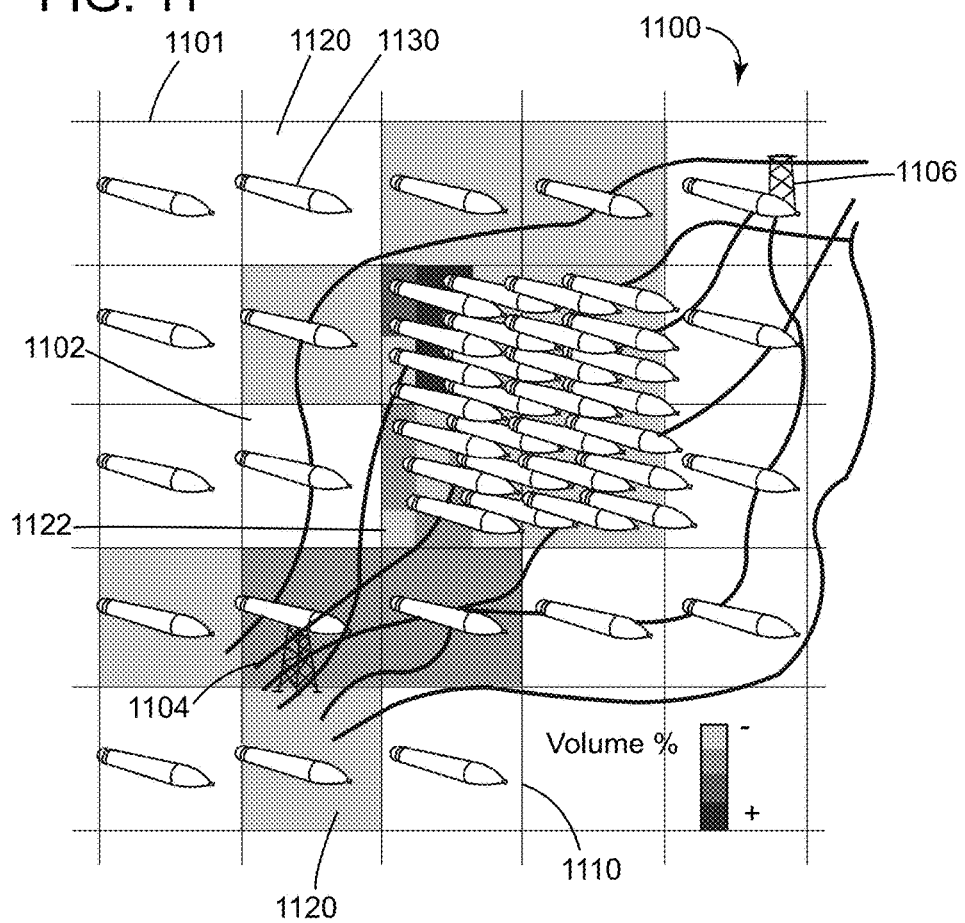
FIG. 11 illustrates a marine seismic survey that uses a light monitor survey.

To exemplify one or more of these considerations, consider FIG. 11 which shows a marine seismic data acquisition system 1100. Area 1101 has been surveyed with a full base seismic survey. Two wells 1104 and 1106 are located above reservoir 1102. Based on the structural image obtained from the full base survey, various targets are identified and associated tiles 1110 are determined. Some of the tiles 1120 are large (very low resolution) while other tiles 1122 are small (higher resolution but still lower than a full base survey). Irrespective of the tile, this embodiment shows a single AUV 1130 per tile. Thus, according to this embodiment, it is possible to have zones with different types of resolution. As discussed above, while this specific embodiment shows one sensor (AUV) per target (the target is described by a corresponding tile), it is possible to have a combination of up to a hundred sensor and source locations per target (or tile) and to use conventional recorder (non-AUV) if agile enough.

In terms of processing, in one embodiment, phase shift measurements at reservoir level are considered during processing. "Phase based" processing is much quicker and easier than conventional processing. In addition, phase based processing is conducive to reduced turnaround. In underground areas affected by the oil production of the well, the elastic properties of the rocks at the reservoir level are modified. These changes induce a seismic velocity change that will modify the "phase" of the signal at the reservoir. Comparing trace by trace for a given frequency the full base and light monitor (in the portions of the base survey that have corresponding traces in the light monitor) will indicate a change in the phase at the reservoir level only if the analyzed area (target in FIGS. 9A and 9B) is affected by the oil production. Such fast processing will provide "binary" information about changes in the reservoir rather than a full update of the structural image. However, this is the information needed by the reservoir engineer for validating her or his scenarios. Thus, by combining the light monitor survey with a phase based processing, the reservoir engineer would be able to receive seismic data indicating changes in the reservoir almost in real time, at a low cost.

Figure 12:
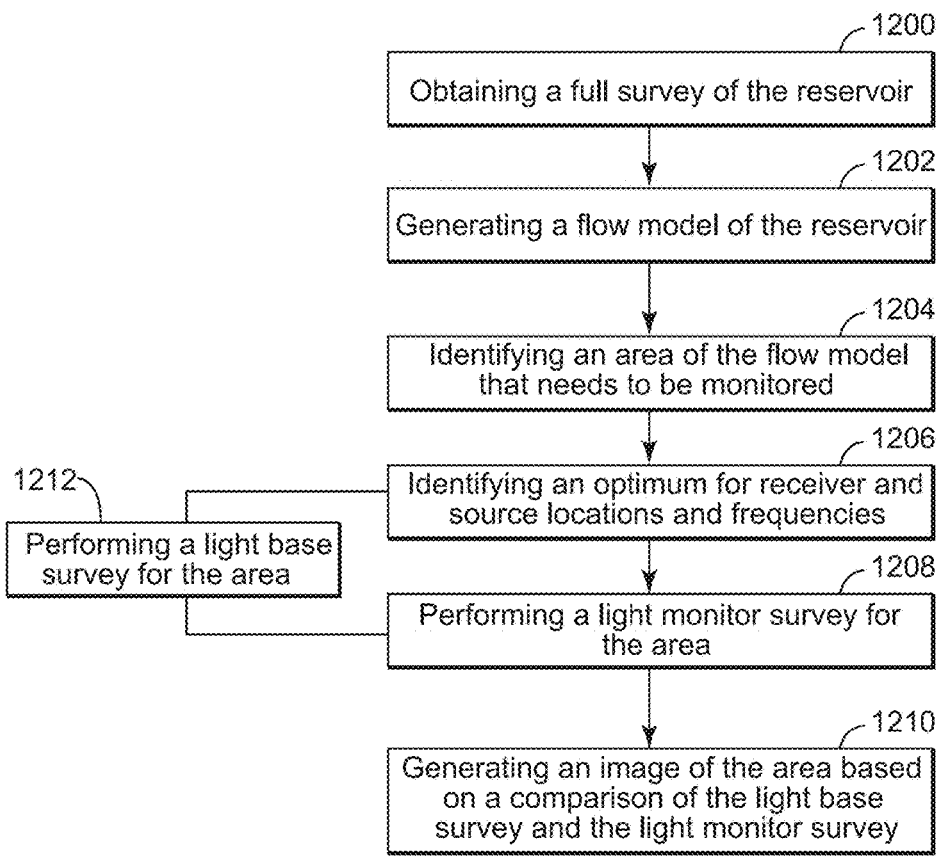
FIG. 12 is a flowchart of a method for performing a 4D survey with full base and light monitor seismic surveys.

According to an embodiment, a method for monitoring an underground reservoir during a 4D survey includes acquiring a full base survey and one or more light monitor surveys for a given area. More specifically, the method includes, as illustrated in FIG. 12, a step 1200 of obtaining a full survey of the reservoir (e.g., either performing the survey or receiving the seismic data from the survey), a step 1202 of generating a flow model or mechanism of the reservoir (generating a flow model or production mechanism is known in the art and not described herein), and a step 1204 of identifying an area of the subsurface that needs to be monitored based on step 1202 information. Note that these steps may be performed by the oil operator while the next steps may be performed by an oil service company. Also note that some steps may be performed later. The method also includes a step 1206 of identifying optimum locations for the receivers and/or sources and source frequencies for the area that needs to be monitored. This step may be performed based on information obtained from the full survey using, for example, demigration and/or inverse ray tracing algorithm. As a result of this step, the method may advance to step 1208 for performing a light monitor survey for the area (e.g., either performing the survey or receiving the seismic data from the survey), and a step 1210 of generating an image of the area based on a comparison of the full survey and the light monitor survey for the area. However, it is possible, as discussed above, that the full survey is not usable for this comparison, only for determining the optimal source/receiver location. In this situation, a light base survey for the area is performed in step 1212, and this information together with the information from step 1208 is used in step 1210 to generate the image of the area, i.e., the image is generated based on a comparison of the light base survey and the monitor light survey. The information gathered is used, as discussed above, to monitor changes in the reservoir, to improve its production. The full base survey uses over 100 source and sensor locations while the light monitor survey uses less than 100 source and sensor locations, and the light monitor survey is conducted later in time than the full base survey.

The method may optionally include, a light monitor survey that uses less than 50 source and sensor locations, or less than 20 source and sensor locations, or less than 10 source and sensor locations, or only one source location and only one sensor location for the area. In one application, a source at the source location generates only a single frequency for the entire light monitor survey. In another application, a source at the source location generates a set of mono-frequencies in a hammering way, for the entire light monitor survey. The method may also include a step of performing an additional light monitor survey, less than a week after the light monitor survey and/or a continuous monitoring.

Figure 13:
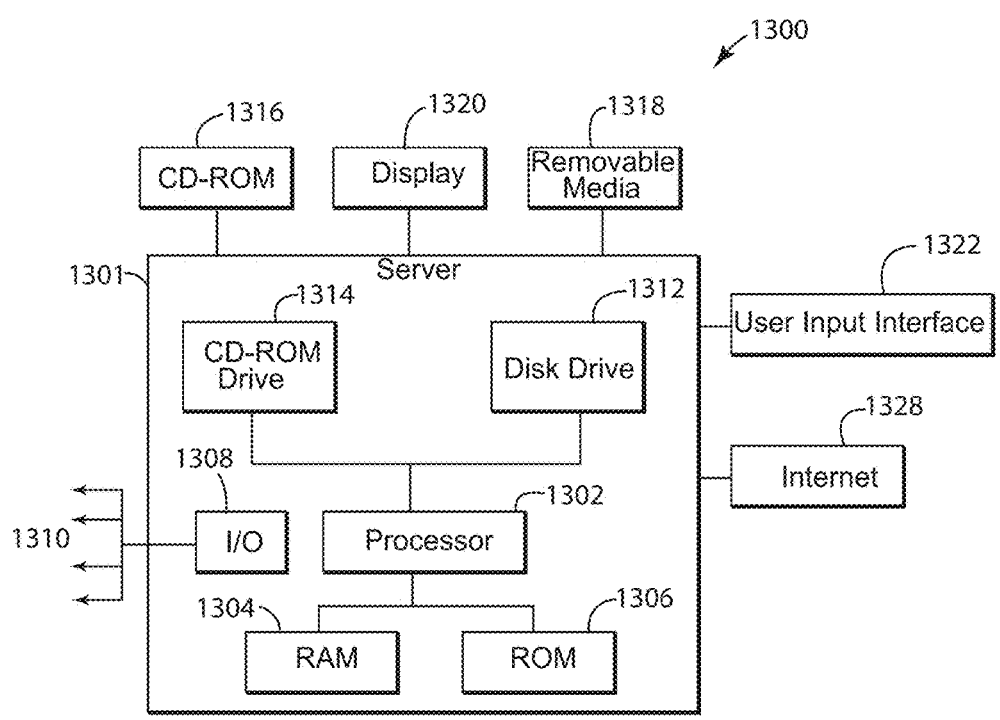
FIG. 13 is a schematic diagram of a computing device for implementing the above methods.

An example of a representative computing device capable of carrying out operations in accordance with the exemplary embodiments discussed above is illustrated in FIG. 13. Hardware, firmware, software or a combination thereof may be used to perform the various steps and operations described herein.

The exemplary computer device 1300 suitable for performing the activities described in the exemplary embodiments may include server 1301. Such a server 1301 may include a central processor unit (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. Processor 1302 may communicate with other internal and external components through input/output (I/O) circuitry 1308 and bussing 1310 to provide control signals and the like. The processor 1302 carries out a variety of functions as are known in the art, as dictated by software and/or firmware instructions.

The server 1301 may also include one or more data storage devices, including hard disk drives 1312, CD-ROM drives 1314, and other hardware capable of reading and/or storing information such as a DVD, etc. In one embodiment, software for carrying out the above-discussed steps may be stored and distributed on a CD-ROM or DVD 1316, removable media 1318 or other form of media capable of portably storing information. These storage media may be inserted into, and read by, devices such as the CD-ROM drive 1314, the drive 1312, etc. The server 1301 may be coupled to a display 1320, which may be any type of known display or presentation screen, such as LCD or LED displays, plasma displays, cathode ray tubes (CRT), etc. A user input interface 1322 is provided, including one or more user interface mechanisms such as a mouse, keyboard, microphone, touch pad, touch screen, voice-recognition system, etc.

The server 1301 may be coupled to other computing devices via a network. The server may be part of a larger network configuration as in a global area network (GAN) such as the Internet 1328.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices, or magnetic storage devices such as floppy disk or magnetic tape. Other non-limiting examples of computer-readable media include flash-type memories or other known types of memories.

The disclosed exemplary embodiments provide an apparatus and a method for quickly and efficiently monitoring an underground reservoir during a 4D survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for monitoring a subsurface during a 4-dimensional (4D) survey, the method comprising:
obtaining a full survey of the subsurface;
identifying receiver and source locations and source frequencies to be emitted during light surveys based on demigration or inverse ray tracing of the full survey;
performing a light base survey according to the receiver and source locations and the source frequencies;
performing a light monitor survey according to the receiver and source locations and the source frequencies; and generating an image of changes in the subsurface based on a comparison of (i) the light base survey, and (ii) the light monitor survey,
wherein any of the light surveys yields substantially less data than obtained during the full survey.

2. The method of claim 1,
wherein the identifying of the receiver and source locations includes:
generating a flow model of a reservoir in the subsurface based on the full survey;
identifying an area including the receiver and source locations based on the flow model, and
wherein the full survey uses over 100 source and sensor locations while the light monitor and light base surveys use less than 100 source and sensor locations, and the light monitor survey is conducted later in time than the light base survey.

3. The method of claim 1, wherein the light monitor or light base survey uses less than 50 source and sensor locations.

4. The method of claim 1, wherein the light monitor survey or light base survey uses less than 20 source and sensor locations.

5. The method of claim 1, wherein the light monitor or the light base survey uses less than 10 source and sensor locations.

6. The method of claim 1, wherein an extra-light monitor survey using only one source location and only one sensor location is performed instead of a new light monitor survey.

7. The method of claim 1, wherein a source at one of the source locations generates only a single frequency during the light monitor or the light base survey.

8. The method of claim 1, wherein a source at one of the source locations generates several mono-frequencies during the light monitor survey.

9. The method of claim 1, further comprising:
performing an additional light monitor survey, less than a week after the light monitor survey or a continuous monitoring.

10. The method of claim 1, wherein one or more of the source frequencies are identified to optimize resolution in one or more target areas where a seismic wave propagation velocity and a signal-to-noise ratio are known from the full survey.

11. A computing device for monitoring a subsurface during a 4-dimensional (4D) survey, the computing device comprising:
an interface for
receiving a full survey of the subsurface,
obtaining first seismic data associated with a light base survey,
obtaining second seismic data associated with a light monitor survey, and
a processor connected to the interface and configured to
identify receiver and source locations and source frequencies to be emitted for light surveys based on demigration or inverse ray tracing of the full survey, and
generate an image of changes in the subsurface based on a comparison of (i) the first seismic data from the light base survey and (ii) the second seismic data from the light monitor survey
wherein any of the light surveys yields substantially less data than obtained during the full survey.

12. The computing device of claim 11,
wherein the processor generates a flow model of a reservoir in the subsurface based on the full survey, and identifyes an area including the receiver and source locations based on the flow model, and
wherein the full base survey uses over 100 source and sensor locations while the light monitor or the light base survey uses less than 100 source and sensor locations, and the light monitor survey is conducted later in time than the light base survey.

13. The computing device of claim 11, wherein the light monitor or the light base survey uses less than 50 source and sensor locations.

14. The computing device of claim 11, wherein the light monitor or the light base survey uses less than 20 source and sensor locations.

15. The computing device of claim 11, wherein the light monitor or the light base survey uses less than 10 source and sensor locations.

16. The computing device of claim 11, wherein an extra-light monitor survey using only one source location and only one sensor location is performed instead of a new light monitor survey.

17. The computing device of claim 11, wherein a source at one of the source locations generates only a single frequency during the light monitor survey or the light base survey.

18. The computing device of claim 11, wherein a source at one of the source locations generates several mono-frequencies during the light monitor survey or the light base survey.

19. A non-transitory computer readable medium including computer executable instructions, wherein the instructions, when executed by a processor, implement instructions for monitoring a subsurface during a 4-dimensional (4D) survey, the instructions comprising:
obtaining a full survey of the subsurface;
identifying receiver and source locations and source frequencies to be emitted during light surveys based on demigration or inverse ray tracing of the full survey;
performing a light base survey according to the receiver and source locations and the source frequencies;
performing a light monitor survey according to the receiver and source locations and the source frequencies; and
generating an image of changes in the subsurface based on a comparison of (i) the light base survey and (ii) the light monitor survey,
wherein any light survey yields substantially less data than obtained during the full survey.

20. The medium of claim 19, wherein the identifying of the receiver and source locations includes generating a flow model of a reservoir in the subsurface based on the full survey, and identifying an area including the receiver and source locations based on the flow model, and
wherein the full survey uses over 100 source and sensor locations while the light monitor or the light base survey uses less than 100 source and sensor locations.

* * * * *